(12) United States Patent
Yanagida et al.

(10) Patent No.: US 10,608,534 B2
(45) Date of Patent: Mar. 31, 2020

(54) DC/DC CONVERTER FOR PROVIDING FUNCTION OF NOISE COUNTERMEASURES, CONTROL CIRCUIT THEREOF, CONTROL METHOD THEREOF, AND ELECTRONIC APPARATUS INCLUDING THE DC/DC CONVERTER

(71) Applicant: ROHM CO., LTD., Kyoto (JP)

(72) Inventors: Osamu Yanagida, Kyoto (JP); Tetsuro Hashimoto, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 16/110,373

(22) Filed: Aug. 23, 2018

(65) Prior Publication Data

US 2019/0068058 A1    Feb. 28, 2019

(30) Foreign Application Priority Data

Aug. 25, 2017 (JP) ................... 2017-162505

(51) Int. Cl.
*H02M 3/158* (2006.01)
*H02M 1/08* (2006.01)
*H02M 1/00* (2006.01)

(52) U.S. Cl.
CPC ........... *H02M 3/158* (2013.01); *H02M 1/083* (2013.01); *H02M 3/1588* (2013.01); *H02M 2001/0032* (2013.01)

(58) Field of Classification Search
CPC .... H02M 1/44; H02M 1/083; H02M 3/33592; H02M 3/33569; H02M 3/158; H02M 3/1588; H02M 2001/0032
See application file for complete search history.

(56) References Cited

U.S. PATENT DOCUMENTS 10,008,954 B2 * 6/2018 Kolar ..................... H02M 1/44
2016/0233779 A1 * 8/2016 Cohen ............... H02M 3/33592
(Continued)

FOREIGN PATENT DOCUMENTS

| JP | 2005304295 A | 10/2005 |
| JP | 2015089325 A | 5/2015 |
| JP | 2015216712 A | 12/2015 |

OTHER PUBLICATIONS

S. H. Kang, D. Maksimović and I. Cohen, "Efficiency Optimization in Digitally Controlled Flyback DC-DC Converters Over Wide Ranges of Operating Conditions," in IEEE Transactions on Power Electronics, vol. 27, No. 8, pp. 3734-3748, Aug. 2012. (Year: 2012).*

*Primary Examiner* — Jeffrey A Gblende
*Assistant Examiner* — Jye-June Lee
(74) *Attorney, Agent, or Firm* — Cantor Colburn LLP

(57) ABSTRACT

A control circuit of a DC/DC converter includes: a driver turning on a switching transistor and turning off a rectifying transistor in on state, turning off the switching transistor and turning on the rectifying transistor in off state, and turning off the switching transistor and turning off the rectifying transistor in high impedance state; and a switching controller controlling the on state, the off state and the high impedance state, wherein the switching controller repeats a process including: transitioning to the off state when predetermined condition is satisfied in the on state; transitioning to the high impedance state with zero-cross of coil current flowing into an inductor as trigger in the off state; measuring variable time per cycle and transitioning to the off state with time-up as trigger; and transitioning to the on state when feedback voltage corresponding to output voltage of the DC/DC converter decreases to lower threshold voltage.

16 Claims, 13 Drawing Sheets

(56) References Cited

U.S. PATENT DOCUMENTS

2017/0264206 A1* 9/2017 Rana ............... H02M 3/33569
2018/0115252 A1* 4/2018 Chang ............. H02M 3/33592
2018/0294734 A1* 10/2018 Song .............. H02M 3/33592

* cited by examiner

DC/DC CONVERTER FOR PROVIDING FUNCTION OF NOISE COUNTERMEASURES, CONTROL CIRCUIT THEREOF, CONTROL METHOD THEREOF, AND ELECTRONIC APPARATUS INCLUDING THE DC/DC CONVERTER

CROSS-REFERENCE TO RELATED APPLICATION

The present application claims priority under 35 U.S.C. § 119 to Japanese Patent Application No. 2017-162505, filed on Aug. 25, 2017, the entire contents of which are incorporated herein by reference.

TECHNICAL FIELD

The present disclosure relates to a DC/DC converter (switching regulator).

BACKGROUND

Electronic apparatuses including smart phones, tablet terminals, digital cameras and laptop computers have DC/DC converters. FIG. 1 is a circuit diagram of a general DC/DC converter. The DC/DC converter 100R of FIG. 1 is a step-down converter (a buck converter) and includes an output circuit 102 and a control circuit 200R. The output circuit 102 includes a switching transistor $M_1$, a rectifying transistor $M_2$, an inductor $L_1$ and an output capacitor $C_1$.

The control circuit 200R includes a pulse modulator 202 and a driver 204. The pulse modulator 202 receives a detection signal $V_S$ corresponding to an output voltage $V_{OUT}$ of the DC/DC converter 100R, and generates a control signal $S_1$ whose duty ratio (pulse width) is adjusted so that the detection signal $V_S$ approaches a target value. The driver 204 drives the switching transistor $M_1$ and the rectifying transistor $M_2$ of the output circuit 102 based on the control signal $S_1$.

In a heavy load state where an output current $I_{OUT}$ is large to some extent, the DC/DC converter 100R operates in a continuous current mode (CCM). In the continuous current mode, the pulse modulator 202 enters a PWM mode and generates the control signal $S_1$ by PWM control.

In a light load state where the output current $I_{OUT}$ becomes small, the DC/DC converter 100R operates in a discontinuous current mode (DCM). In the light load state, the pulse modulator 202 enters a mode (called a PFM mode) different from the PWM mode and generates the control signal $S_1$ by PFM control.

FIG. 2 is an operation waveform diagram of the DC/DC converter 100R in a PFM mode. FIG. 2 shows a coil current $I_L$, the state of the switching transistor $M_1$, the state of the rectifying transistor $M_2$, and an output voltage $V_{OUT}$. The PFM mode includes an on-state $T_{ON}$, an off-state $T_{OFF}$ and a high impedance state $T_{HiZ}$. In the on-state $T_{ON}$, the switching transistor $M_1$ is turned on, the rectifying transistor $M_2$ is turned off, and a voltage $(V_{IN}-V_{OUT})$ is applied across the inductor $L_1$. In the on-state $T_{ON}$, the coil current $I_L$ increases with a slope $(V_{IN}-V_{OUT})/L$.

When the coil current $I_L$ reaches a predetermined peak value at time $t_1$ or when a predetermined on-time elapses, the PFM mode transitions to the off-state $T_{OFF}$. In the off-state $T_{OFF}$, the switching transistor $M_1$ is turned off, the rectifying transistor $M_2$ is turned on, and a voltage $-V_{OUT}$ is applied across the inductor $L_1$. In the off-state $T_{OFF}$, the coil current $I_L$ decreases with a slope $(-V_{OUT})/L$.

When the coil current $I_L$ decrease to zero at time $t_2$, the PFM mode transitions to the high impedance state $T_{HiZ}$. In the high impedance state $T_{HiZ}$, both the switching transistor $M_1$ and the rectifying transistor $M_2$ are turned off, one end of the inductor $L_1$ is turned to high impedance, and the coil current $I_L$ is maintained at zero. In the state where the coil current $I_L$ is zero, the output capacitor $C_1$ is discharged with a load current $I_{OUT}$, and the output voltage $V_{OUT}$ is lowered. When the output voltage $V_{OUT}$ drops to a voltage $V_{OUT(REF)}$ defining a target value at time $t_3$, the PFM mode returns to the on-state $T_{ON}$.

In the PFM mode, as the load current $I_{OUT}$ decreases, a rate of decrease of the output voltage $V_{OUT}$ in the high impedance state $T_{HiZ}$ decreases, so that a length of the high impedance state $T_{HiZ}$ increases. That is, as the load current $I_{OUT}$ decreases, the switching frequency $f_{SW}$ decreases, the switching loss decreases, and the efficiency can be improved.

In the PFM mode, noise problems occur in exchange for efficiency improvement. Specifically, when the switching frequency $f_{SW}$ enters an audible band, acoustic noise may be generated in some cases. In particular, when a ceramic capacitor is used for the output capacitor $C_1$, the sound of the ceramic capacitor becomes a problem.

These problems may be caused in switching power supplies having different topologies of not only a step-down type but also a step-up type and a step-up/down type. The problems described here should not be understood as general recognition by those skilled in the art, but rather, they were originally recognized by the present inventors.

SUMMARY

Some embodiments of the present disclosure provide a DC/DC converter and a control circuit thereof capable of providing a function of noise countermeasures.

According to one embodiment of the present disclosure, there is provided a control circuit of a DC/DC converter. The control circuit includes: a driver configured to (i) turn on a switching transistor and turn off a rectifying transistor in an on state, (ii) turn off the switching transistor and turn on the rectifying transistor in an off state, and (iii) turn off the switching transistor and turn off the rectifying transistor in a high impedance state; and a switching controller configured to control the on state, the off state and the high impedance state. The switching controller is further configured to repeat a process including: transitioning to the off state when a predetermined condition is satisfied in the on state; transitioning to the high impedance state with a zero-cross of a coil current flowing into an inductor as a trigger in the off state; measuring a variable time for each cycle and transitioning to the off state with time-up as a trigger; and transitioning to the on state when a feedback voltage corresponding to an output voltage of the DC/DC converter decreases to a lower threshold voltage.

According to the embodiment, a switching frequency of the DC/DC converter may be controlled in accordance with a variable time, thus providing a function of noise countermeasures.

In particular, a spectrum spreading may be achieved by varying the variable time over time, thus suppressing a peak in a noise of a specific frequency.

In some embodiments, the switching controller may include: an off signal generation circuit that asserts an off signal when the condition of transition to the off state is satisfied; a zero-cross detection circuit that asserts a zero-cross detection signal upon detecting the zero-cross of the coil current; a timer that measures time and asserts a timer signal when the variable time elapses; a frequency controller that changes the variable time to be measured by the timer; a bottom detection circuit that asserts an on signal when the feedback voltage decreases to the lower threshold voltage; and a logic circuit that transitions to the off state in response to the assertion of the off signal, transitions to the high impedance state in response to the assertion of the zero-cross detection signal, transitions to the off state in response to the assertion of the timer signal, and transitions to the on state in response to the assertion of the on signal.

In some embodiments, the timer may repeat the measurement of the variable time in a free run.

In some embodiments, the timer may start time measurement with the transition to the high impedance state as a trigger. In some embodiments, the timer may start time measurement with the transition from the off state or the transition to the off state as a trigger.

In some embodiments, the variable time may vary such that a periodic waveform of the switching frequency of the DC/DC converter becomes vertically asymmetrical.

In some embodiments, a time average value of the periodic waveform of the switching frequency may be lower than a midpoint frequency between a peak frequency and a bottom frequency of the periodic waveform. Thus, a period of an operation at a lower switching frequency becomes relatively long, thereby increasing an efficiency.

In some embodiments, the periodic waveform of the switching frequency may vary relatively linearly in a high frequency region and vary relatively curvilinearly in a low frequency region.

In some embodiments, the periodic waveform of the switching frequency may vary with a relatively large slope in a high frequency region and vary with a relatively small slope in a low frequency region.

In some embodiments, the control circuit may be integrated on a single semiconductor substrate. The term "integration" as used herein may include a case where all the components of a circuit are formed on a semiconductor substrate or a case where main components of a circuit are integrated, and some resistors, capacitors, or the like may be installed outside the semiconductor substrate in order to adjust circuit constants. By integrating the circuit on one integrated circuit (IC), it is possible to reduce a circuit area and to keep characteristics of circuit elements uniform.

According to another embodiment of the present disclosure, there is provided a DC/DC converter. The DC/DC converter may include: an output circuit including at least an inductor or a transformer, a switching transistor, a rectifying transistor and an output capacitor; and any one of the aforementioned control circuits.

According to another embodiment of the present disclosure, there is provided an electronic apparatus. The electronic apparatus includes the aforementioned DC/DC converter.

Any combinations of the above-described elements or replacement of the representations of the present disclosure between methods, apparatuses and systems are effective as embodiments of the present disclosure.

DETAILED DESCRIPTION

Figure 1:
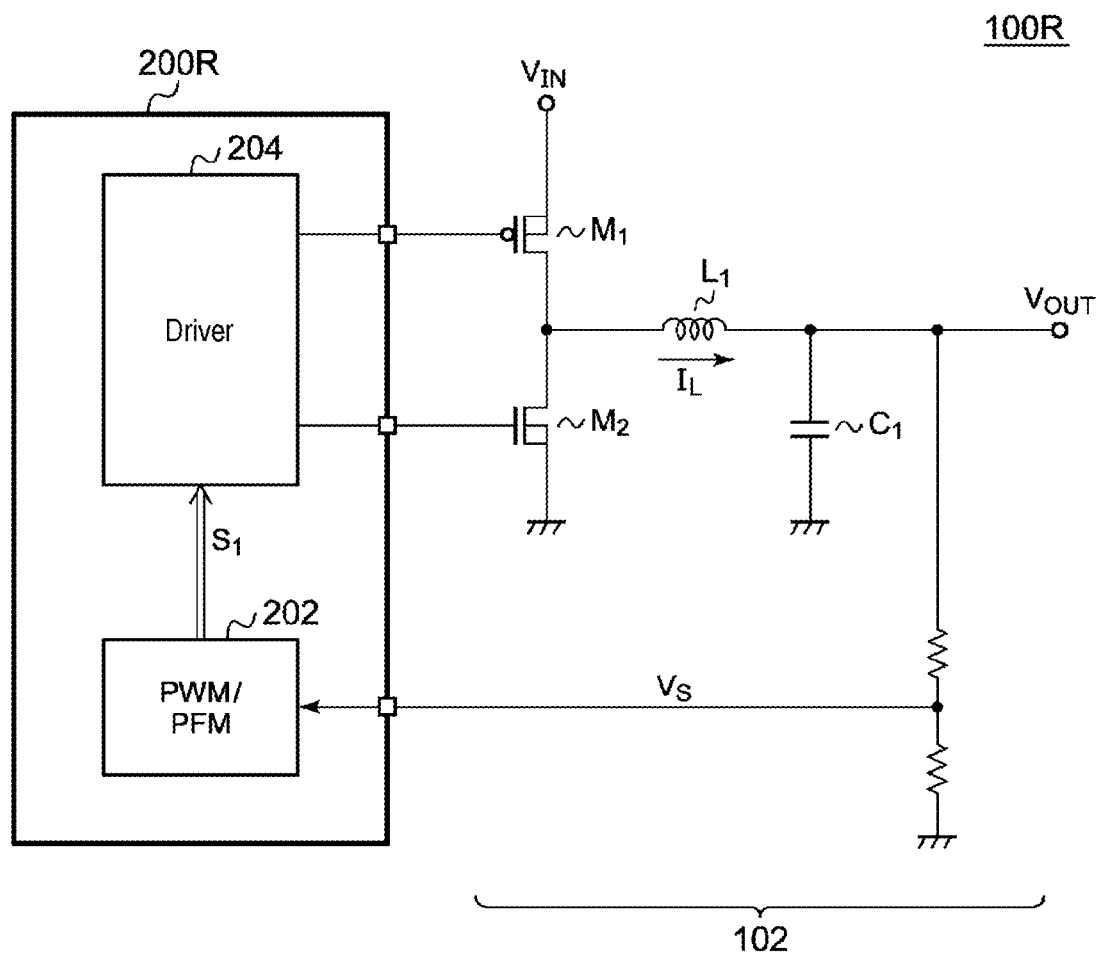
FIG. 1 is a circuit diagram of a general DC/DC converter.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

The vertical and horizontal axes of a waveform diagram or a time chart referred to in the present disclosure are appropriately enlarged and contracted for easy understanding, and each waveform shown is simplified, exaggerated or emphasized for easy understanding.

Figure 3:
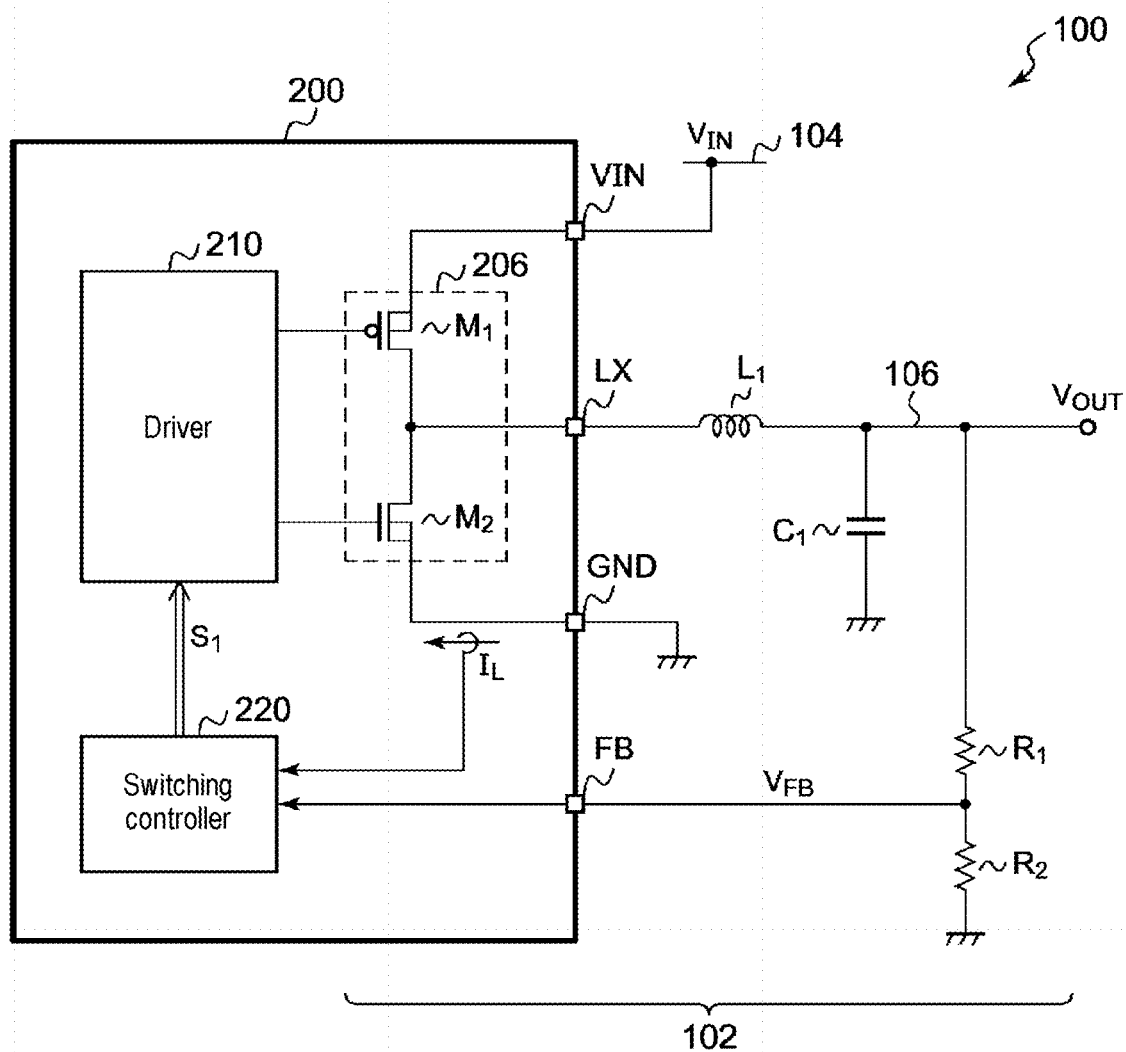
FIG. 3 is a block diagram of a DC/DC converter according to an embodiment.

FIG. 3 is a block diagram of a DC/DC converter 100 according to an embodiment of the present disclosure. The DC/DC converter 100, which is a step-down converter, steps down an input voltage $V_{IN}$ applied to an input line 104, and supplies an output voltage $V_{OUT}$ stabilized to a predetermined target level to a load (not shown) connected to an output line 106.

The DC/DC converter 100 includes an output circuit 102 and a control circuit 200. The output circuit 102 includes a switching transistor $M_1$, a rectifying transistor $M_2$, an inductor $L_1$ and an output capacitor $C_1$. Since the output circuit 102 has the same topology as that of the general step-down DC/DC converter, explanation thereof is omitted.

The control circuit 200 is a functional integrated circuit (IC) integrated on one semiconductor substrate. In this embodiment, the switching transistor $M_1$ and the rectifying transistor $M_2$ are integrated into the control circuit 200, but, without being limited thereto, they may be external discrete components.

An input (VIN) terminal of the control circuit 200 is connected to an input line 104, and an input voltage $V_{IN}$ is supplied to the VIN terminal. An output (LX) terminal is connected to one end of the inductor $L_1$. A ground (GND) terminal is grounded. A feedback voltage $V_{FB}$ corresponding to the output voltage $V_{OUT}$ is inputted to a feedback (FB) terminal. A feedback voltage $V_{FB}$ is generated by a voltage divider circuit including resistors $R_1$ and $R_2$. The voltage divider circuit may be omitted and the output voltage $V_{OUT}$ may be set as the feedback voltage $V_{FB}$.

The control circuit 200 controls switching of the switching transistor $M_1$ and the rectifying transistor $M_2$ so that the fed-back output voltage $V_{FB}$ approaches a target level.

The control circuit 200 operates in different operation modes between a heavy load state and a light load state, as described with reference to FIG. 1. Regarding the operation of the heavy load state, since well-known techniques such as (i) PWM control, (ii) ripple control such as hysteresis control, bottom detection on-time fixing control and upper detection off-time fixing control, etc. may be used, explanation thereof is omitted.

The control circuit 200 includes a driver 210 and a switching controller 220. The driver 210 is configured to drive a switching circuit 206 including the switching transistor $M_1$ and the rectifying transistor $M_2$ in three states including an on state, an off state and a high impedance state.

(i) On state $T_{ON}$
Switching transistor $M_1$: ON
Rectifying transistor $M_2$: OFF
(ii) Off state $T_{OFF}$
Switching transistor $M_1$: OFF
Rectifying transistor $M_2$: ON
(iii) High impedance state $T_{HiZ}$
Switching transistor $M_1$: OFF
Rectifying transistor $M_2$: OFF In the light load state, the switching controller 220 controls the three states including the on state, the off state and the high impedance state based on the feedback voltage $V_{FB}$ and the coil current $I_L$, and supplies a control signal $S_{CNT}$ for indicating a state to the driver 210.

Figure 4:
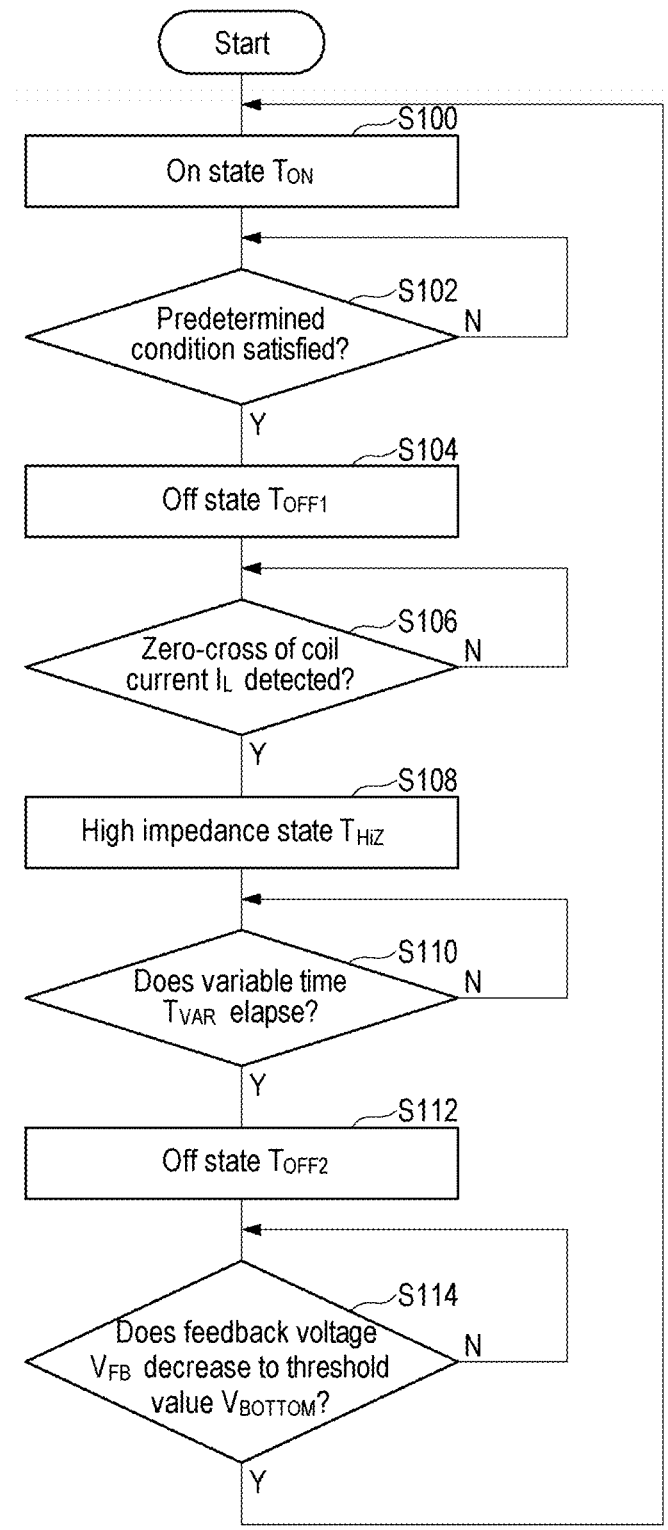
FIG. 4 is a flow chart of an operation of a switching controller in a light load state.

FIG. 4 is a flow chart of the operation of the switching controller 220 in the light load state.

Initially, the operation of the switching controller 220 is set to the on state $T_{ON}$ (S100). When a predetermined condition is satisfied in the on state $T_{ON}$ (Y in S102), the operation transitions to a first off state $T_{OFF1}$ (S104). In one example, the predetermined condition is the lapse of a predetermined time. In another example, the predetermined condition may be that the coil current $I_L$ flowing through the inductor $L_1$ reaches a predetermined peak value.

In the first off state $T_{OFF1}$, when the zero-cross of the coil current $I_L$ flowing through the inductor $L_1$ is detected (Y in S106), the operation transitions to the high impedance state $T_{HiZ}$ (S108).

Next, a variable time $T_{VAR}$ is measured for each cycle. With time-up as a trigger (Y in S110), the operation transitions to a second off state $T_{OFF2}$ (S112). The variable time $T_{VAR}$ may be varied for each switching cycle or a plurality of switching cycles as a unit.

When the feedback voltage $V_{FB}$ decreases to a lower threshold voltage $V_{BOTTOM}$ (S114), the operation returns to the on state $T_{ON}$ (S100). In the high impedance state $T_{HiZ}$ (S108), when the feedback voltage $V_{FB}$ decreases to the threshold voltage $V_{BOTTOM}$ before the elapse of the variable time $T_{VAR}$, the operation may immediately return to the on state $T_{ON}$ (S100).

Figure 5:
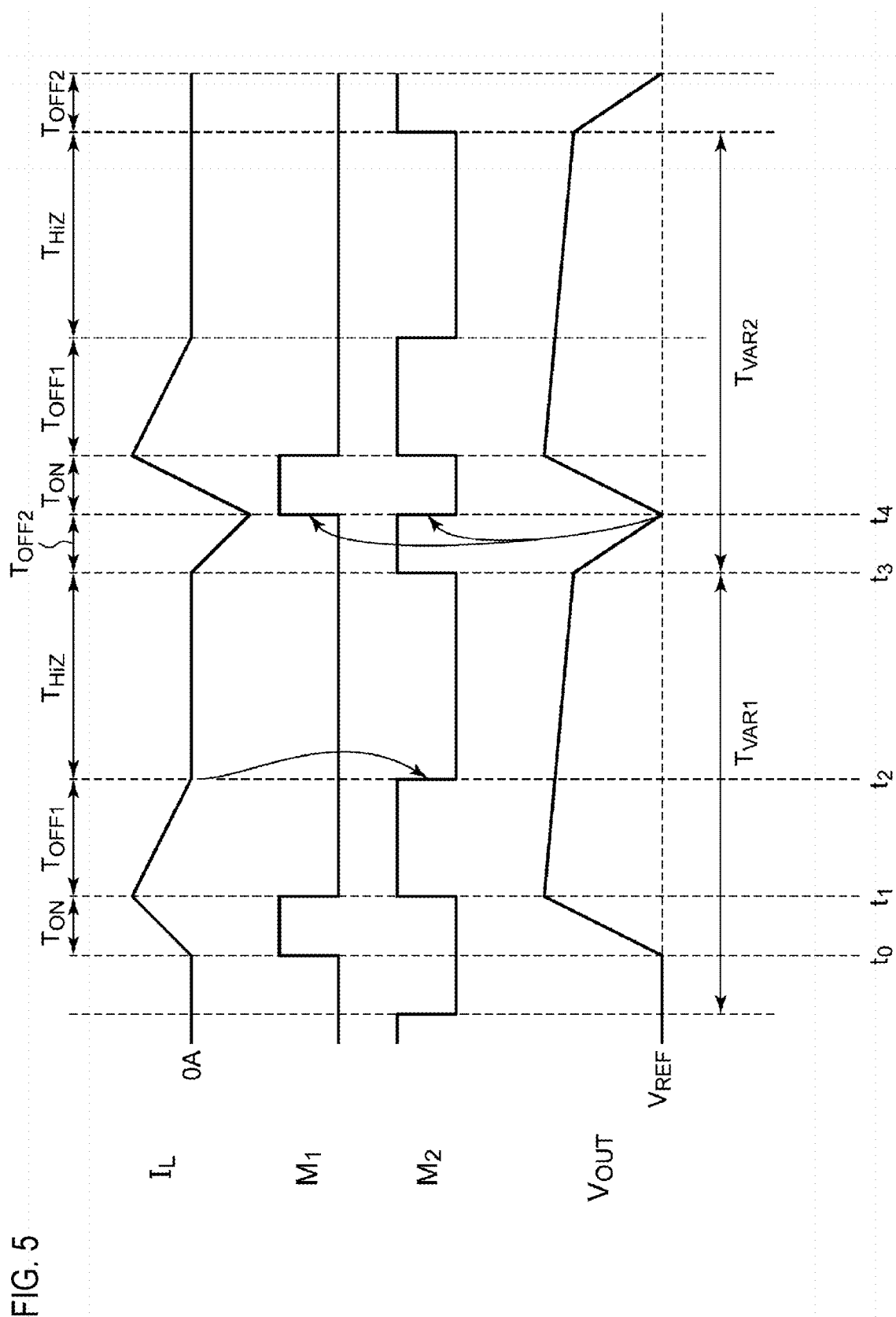
FIG. 5 is an operation waveform diagram of the DC/DC converter of FIG. 3.

The above is the configuration of the DC/DC converter 100. Subsequently, the operation of the DC/DC converter 100 will be described. FIG. 5 is an operation waveform diagram of the DC/DC converter 100 of FIG. 3.

At time $t_0$, the operation is set to the on state $T_{ON}$. In the on state $T_{ON}$, when a predetermined condition is satisfied, the operation transitions to the off state $T_{OFF1}$ (time $t_1$). In the off state $T_{OFF1}$, the coil current $I_L$ decreases. When the coil current $I_L$ zero-crosses at time $t_2$, the operation transitions to the high impedance state $T_{HiZ}$. In the meantime, a variable time $T_{VAR}$ is measured by a timer. Then, at time $t_3$, when the timer completes the measurement of the variable time $T_{VAR}$ (time-up), the operation transitions to the second off state $T_{OFF2}$.

In this example, the timer is a free run and immediately starts to measure a variable time $T_{VAR2}$ of the next cycle when the variable time $T_{VAR1}$ of one cycle is completed.

In the second off state $T_{OFF2}$, a negative coil current $I_L$ flows. The output capacitor $C_1$ is discharged with the negative coil current $I_L$ and the output voltage $V_{OUT}$ decreases. Then, when the feedback voltage $V_{FB}$ decreases to the bottom voltage $V_{BOTTOM}$ at time $t_4$, in other words, when the output voltage $V_{OUT}$ decreases to the reference voltage $V_{OUT}$ (REF), the operation returns to the on state $T_{ON}$. The DC/DC converter 100 repeats this operation in the light load state.

Figure 2:
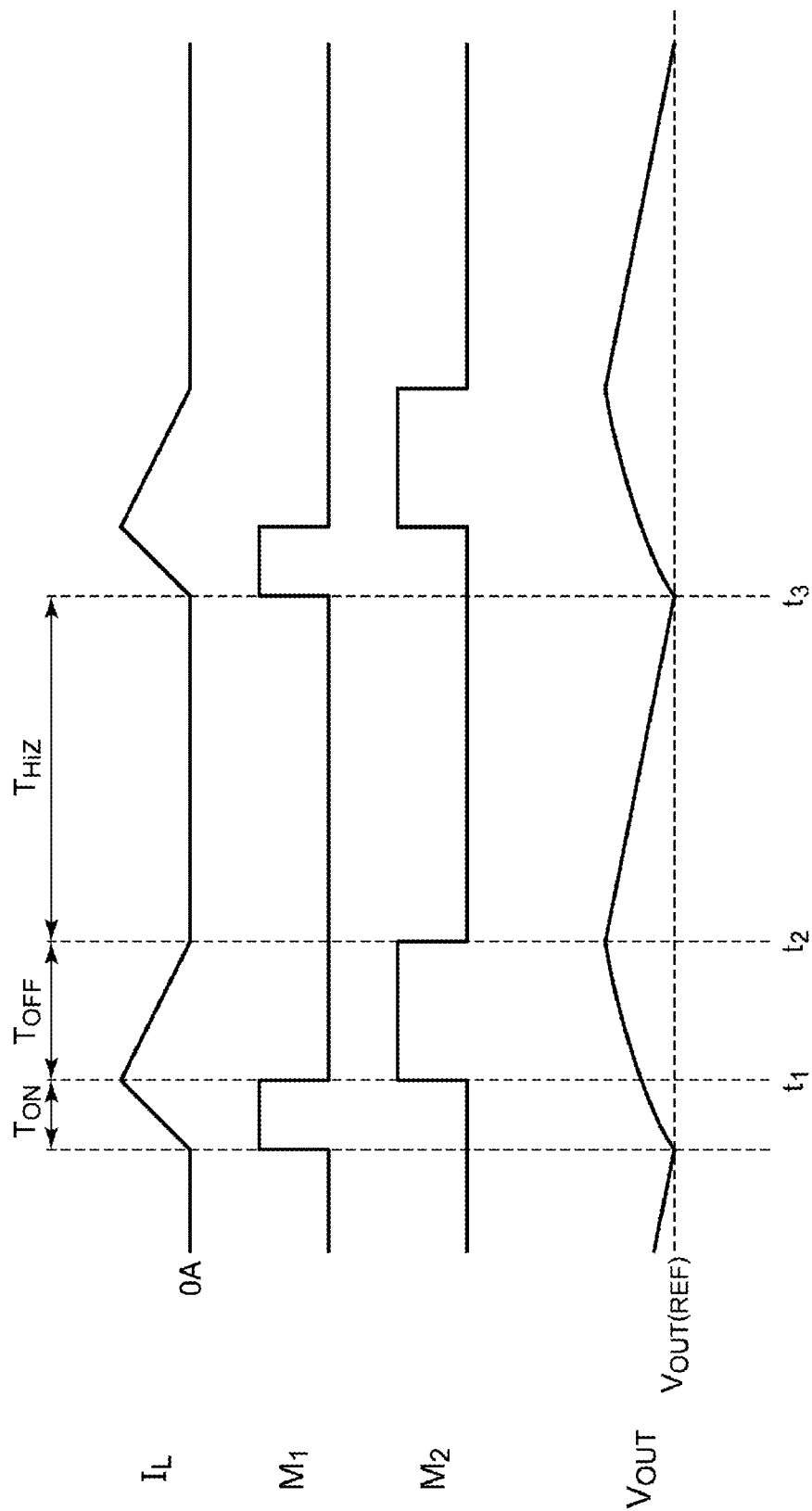
FIG. 2 is an operation waveform diagram of the DC/DC converter in a PFM mode.

In the DC/DC converter 100, the switching frequency $f_{SW}$ in the light load state is $1/T_{VAR}$. Accordingly, the switching frequency $f_{SW}$ can be controlled in response to the variable time $T_{VAR}$ in comparison with the operation waveform diagram in FIG. 2.

In some embodiments, the variable time $T_{VAR}$ may be varied over time and the switching frequency $f_{SW}$ is changed (modulated) with time. The switching frequency $f_{SW}$ may be periodically varied in consideration of easiness of control of the variable time $T_{VAR}$ (simplification of hardware).

Figure 6:
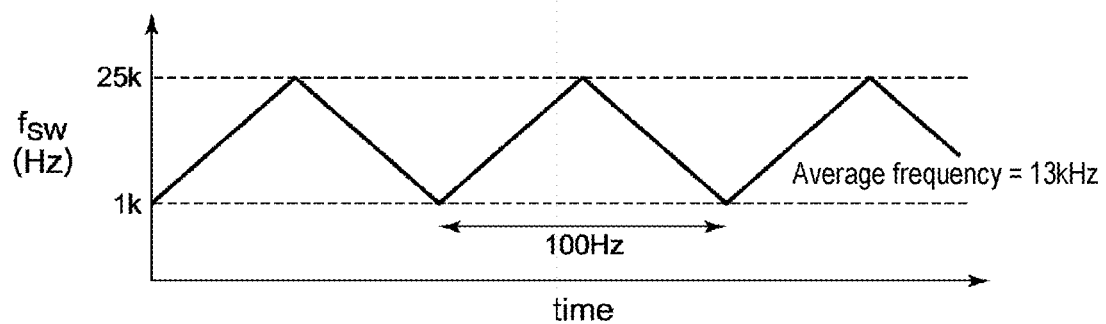
FIG. 6 is a view showing a waveform of a switching frequency $f_{SW}$ according to an embodiment of the present disclosure.

FIG. 6 is a view showing a waveform of the switching frequency $f_{SW}$ according to an embodiment of the present disclosure. In this embodiment, the switching frequency $f_{SW}$ is a periodic triangular wave. The period of the triangular wave may be equal to or less than 1 kHz, for example, about 50 to 200 Hz. In this example, the period of the triangular wave is 100 Hz.

The range of variation of the switching frequency $f_{SW}$ may overlap with an audible band (20 to 20 kHz). In this example, the switching frequency $f_{SW}$ varies with 1 kHz as the bottom and 25 kHz as the peak. Therefore, the variable time $T_{VAR}$ varies from cycle to cycle within a range of 40 μs to 1 ms so that the switching frequency $f_{SW}$ becomes a target waveform as shown in FIG. 6.

A sawtooth wave, a trapezoidal waves and a sinusoidal wave may be used instead of the triangular wave.

Figure 7:
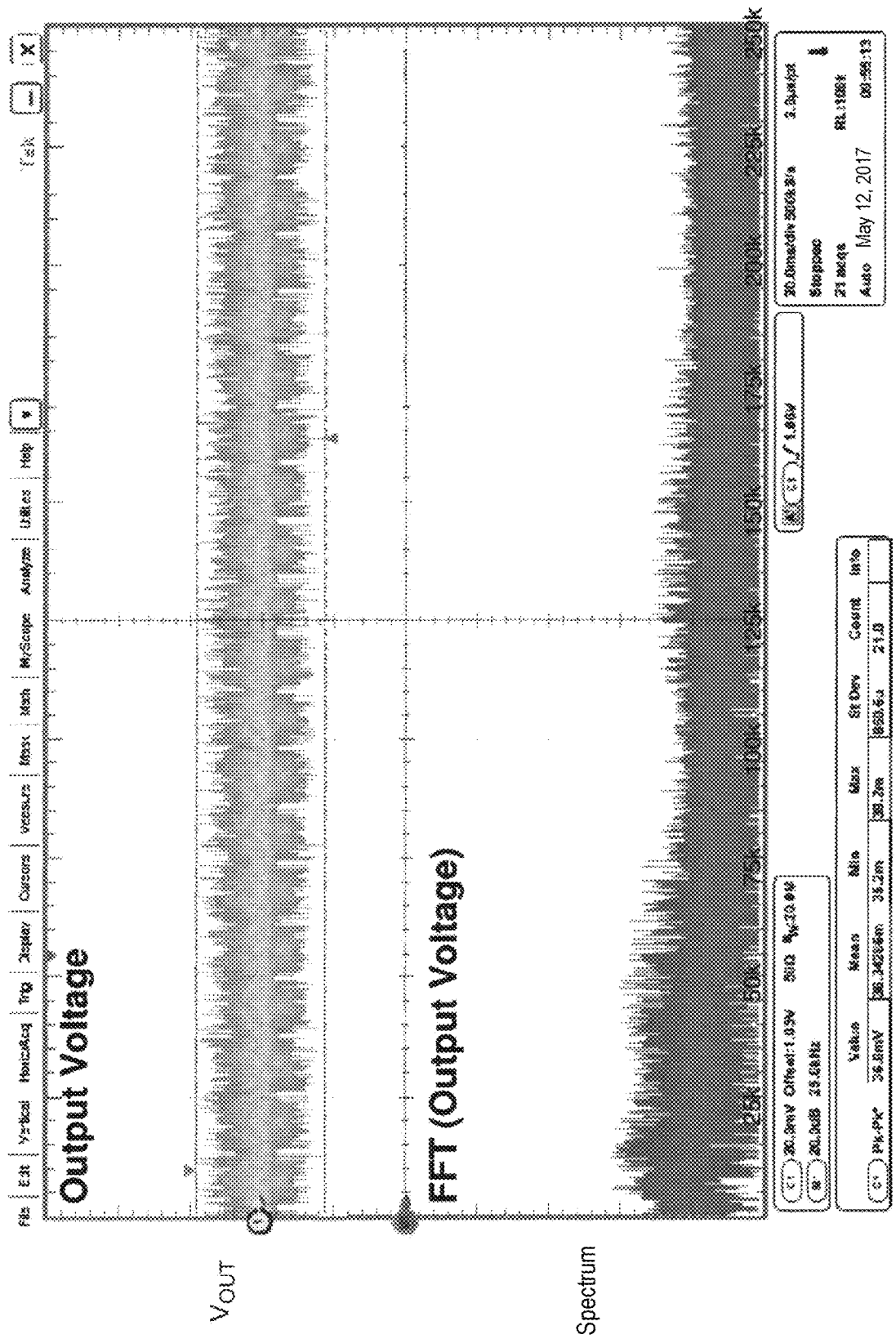
FIG. 7 is a view showing a time waveform of an output voltage $V_{OUT}$ corresponding to the switching frequency $f_{SW}$ in FIG. 6, and its spectrum.

FIG. 7 is a view showing a time waveform of the output voltage $V_{OUT}$ corresponding to the switching frequency $f_{SW}$ in FIG. 6, and its spectrum. The spectrum is generated by fast Fourier transform of the output voltage $V_{OUT}$. By changing the switching frequency $f_{SW}$ to an audio band lower than 20 kHz, efficiency can be improved as compared with a case where the switching frequency $f_{SW}$ is fixed at a frequency of 20 kHz or more.

As a result of the modulation of the switching frequency $f_{SW}$, the spectrum component of the output voltage $V_{OuT}$ includes an audio band, but since the spectrum is spread and energy per unit band is small, the sound of the output capacitor $C_1$ can be suppressed.

Figure 8:
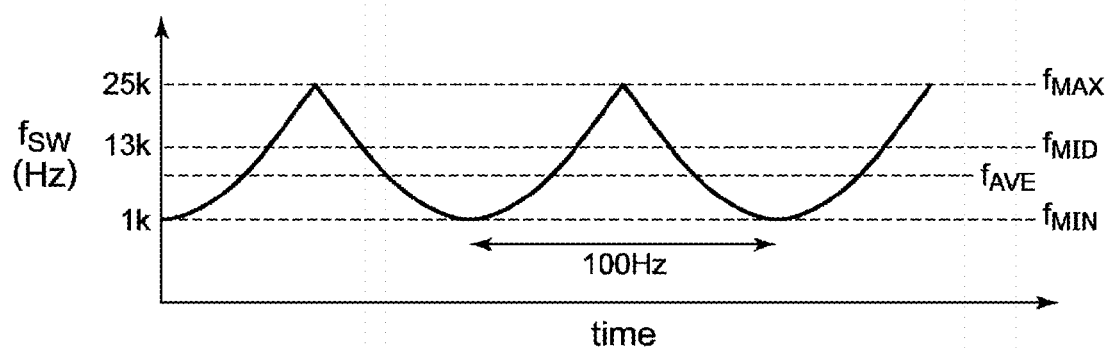
FIG. 8 is a view showing the waveform of a switching frequency $f_{SW}$ according to an embodiment of the present disclosure.

FIG. 8 is a view showing a waveform of the switching frequency $f_{SW}$ according to an embodiment of the present disclosure. In this embodiment, the periodic waveform of the switching frequency $f_{SW}$ is vertically asymmetrical. Specifically, the time average value $f_{AVE}$ of the periodic waveform of the switching frequency $f_{SW}$ is defined to be lower than the midpoint frequency $f_{MID}$ (13 kHz) between the highest frequency $f_{MAX}$ (25 kHz) and the lowest frequency $f_{MIN}$ of the periodic waveform.

The periodic waveform of the switching frequency $f_{SW}$ changes relatively linearly in a high frequency region and relatively curvilinearly in a low frequency region. From another viewpoint, the periodic waveform of the switching frequency $f_{SW}$ changes with a relatively large slope in the high frequency region and with a relatively small slope in the low frequency region.

Figure 9:
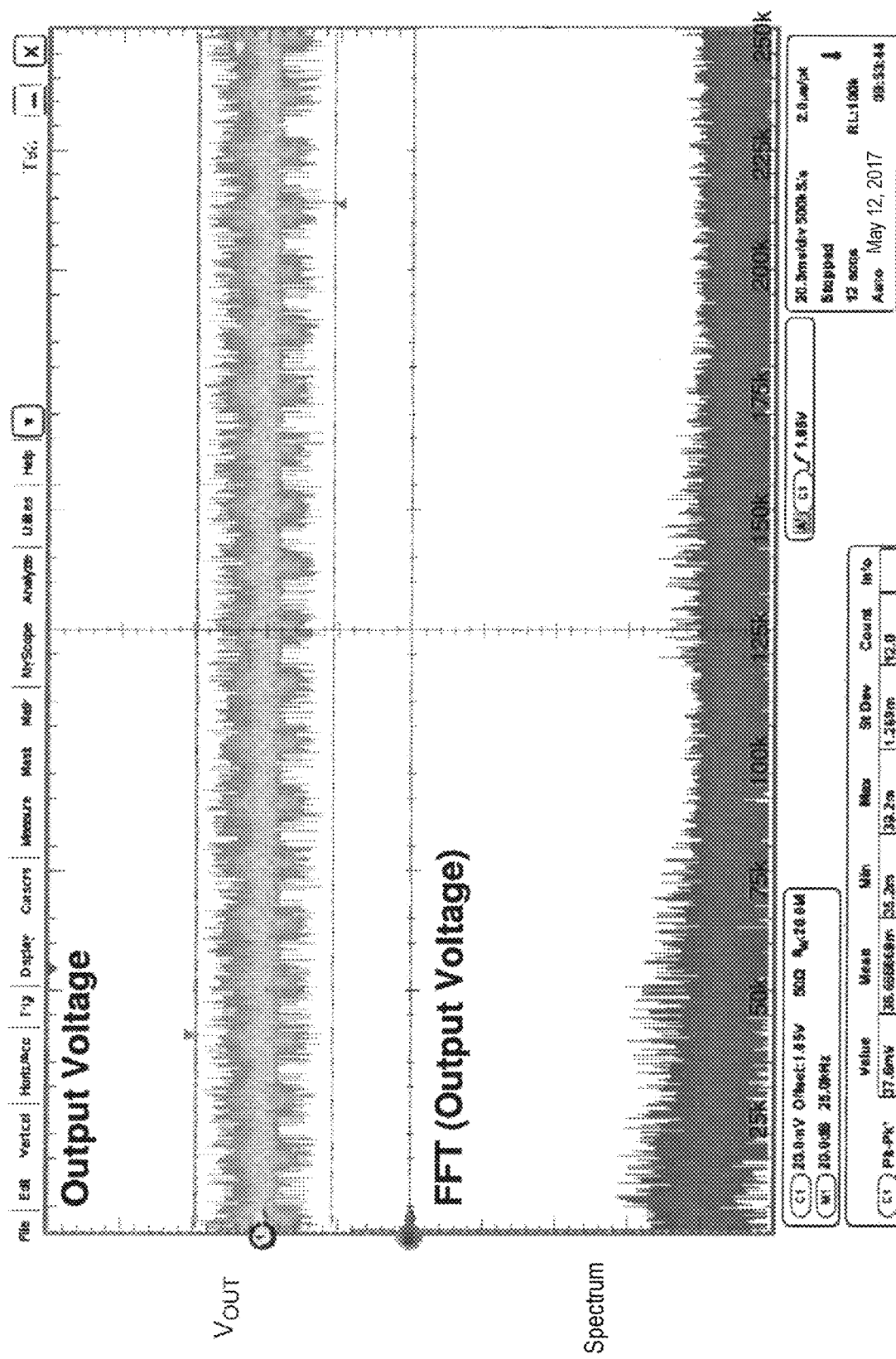
FIG. 9 is a view showing a time waveform of an output voltage $V_{OUT}$ corresponding to the switching frequency $f_{SW}$ in FIG. 8, and its spectrum.

FIG. 9 is a view showing a time waveform of the output voltage $V_{OUT}$ corresponding to the switching frequency $f_{SW}$ in FIG. 8, and its spectrum. Even in this case, the efficiency can be improved as compared with the case where the switching frequency is fixed at 20 kHz or more. Further, the sound of the output capacitor $C_1$ can be suppressed by spectrum spreading.

Figure 10:
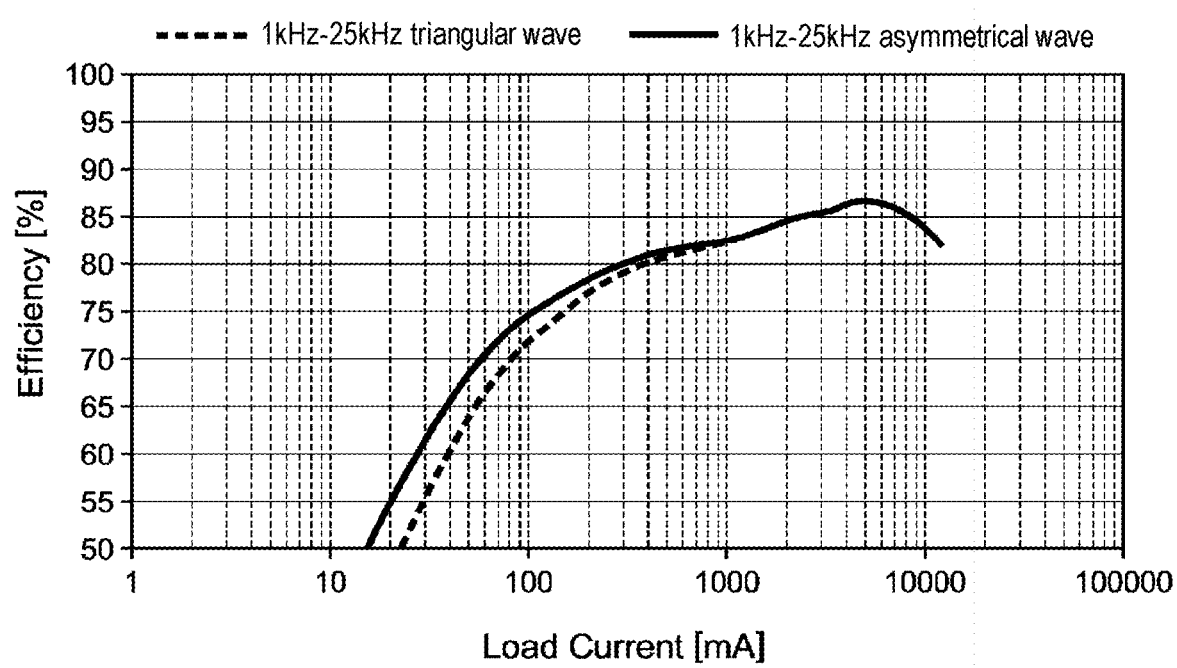
FIG. 10 is a view showing the efficiency of a DC/DC converter when a periodic waveform of a switching frequency $f_{SW}$ is defined as a triangular wave in FIG. 6 and as an asymmetrical wave in FIG. 8.

FIG. 10 is a view showing an efficiency of the DC/DC converter when the periodic waveform of the switching frequency $f_{SW}$ is defined as the triangular wave in FIG. 6 and the asymmetrical wave in FIG. 8. In the case of using the asymmetrical wave of FIG. 8, since the effective switching frequency $f_{SW}$ is lower than in the case of using the triangular wave of FIG. 6, the efficiency can be further improved.

The present disclosure covers various devices and circuits which are grasped as the block diagram and the circuit diagram of FIG. 3 or derived from the above description. However, the present disclosure is not limited to the disclosed specific configurations. Hereinafter, more specific examples and modifications will be described in order to aid the understanding of the nature and circuit operation of the present disclosure and clarify them, rather than to narrow the scope of the present disclosure.

Figure 11:
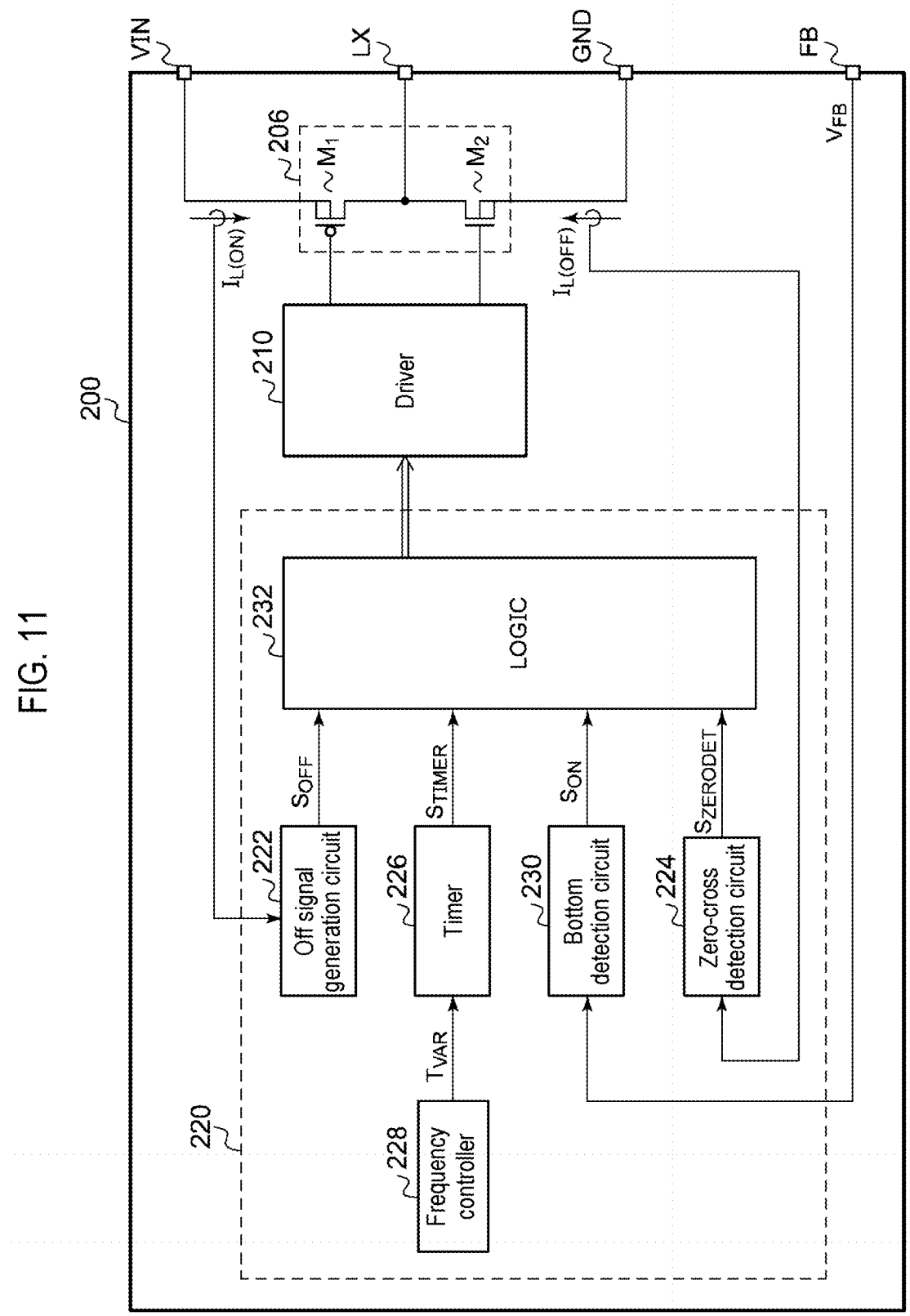
FIG. 11 is a circuit diagram of a control circuit according to an embodiment of the present disclosure.

Subsequently, a specific configuration example of the control circuit 200 will be described. FIG. 11 is a circuit diagram of the control circuit 200 according to an embodiment of the present disclosure. The switching controller 220 includes an off signal generation circuit 222, a zero-cross detection circuit 224, a timer 226, a frequency controller 228, a bottom detection circuit 230 and a logic circuit 232.

The off signal generation circuit 222 asserts (for example, a high level) an off signal $S_{OFF}$ in the on state $T_{ON}$ when the condition of transition to the next off state $T_{OFF1}$ is satisfied. When the predetermined condition is the lapse of a predetermined time, the off signal generation circuit 222 can be constituted by a timer circuit.

The predetermined condition may be that a coil current $I_{L(ON)}$ reaches a peak current. In this case, the off signal generation circuit 222 may be constituted by a current detection circuit for generating a current detection signal corresponding to the current $I_{L(ON)}$ flowing into the inductor $L_1$ via the switching transistor $M_1$, and a comparator for comparing the current detection signal with a threshold value corresponding to the peak current. The method of current detection is not particularly limited. For example, a current may be detected based on a voltage drop (voltage of the LX terminal) of the switching transistor $M_1$.

The zero-cross detection circuit 224 asserts a zero-cross detection signal $S_{ZERODET}$ in the off state when detecting the zero-cross of a coil current $I_{L(OFF)}$ flowing into the inductor $L_1$ via the rectifying transistor $M_2$. The zero-cross of the coil current $I_L(oFF)$ may be a point at which the coil current $I_{L(OFF)}$ intersects with zero or a threshold value in the vicinity thereof and the polarity of the coil current $I_{L(OFF)}$ is inverted.

The timer 226 measures the time and asserts a timer signal $S_{TIMER}$ when the variable time $T_{VAR}$ elapses. The timer 226 may perform a free run operation.

The frequency controller 228 changes the variable time $T_{VAR}$ to be measured by the timer 226 for each cycle. The time waveform of the variable time $T_{VAR}$ can be obtained from the waveform of the switching frequency $f_{SW}$.

The bottom detection circuit 230 asserts an on signal $S_{ON}$ when the feedback voltage $V_{FB}$ decreases to the lower threshold voltage $V_{BOTTOM}$.

The logic circuit 232 transitions to the off state $T_{OFF1}$ in response to the assertion of the off signal $S_{OFF}$. In addition, it transitions to the high impedance state $T_{HiZ}$ in response to the assertion of the zero-cross detection signal $S_{ZERODET}$. In addition, it transitions to the off state $T_{OFF2}$ in response to the assertion of the timer signal $S_{TIMER}$. In addition, it transitions to the on state $T_{ON}$ in response to the assertion of the on signal $S_{ON}$.

(Applications)

Figure 12:
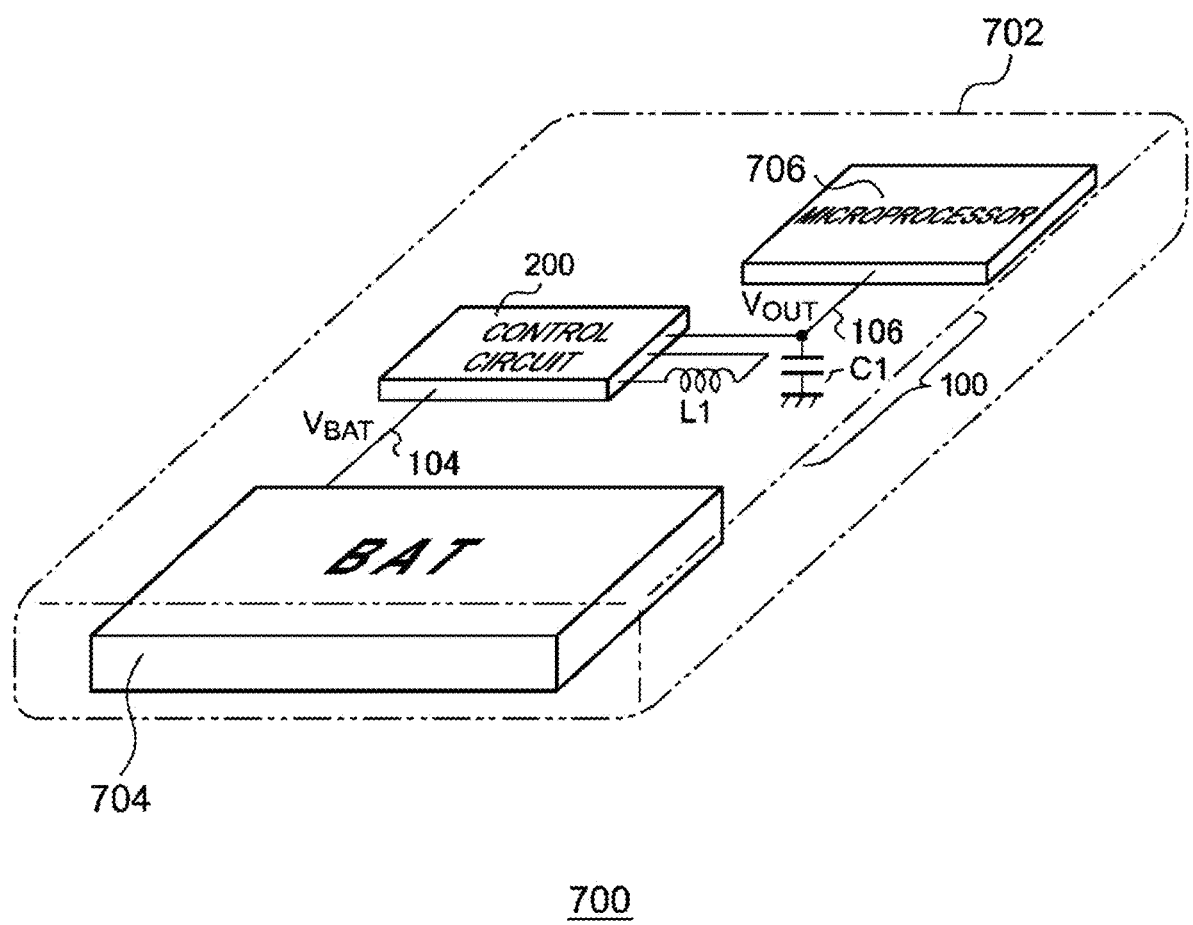
FIG. 12 is a view showing one example of an electronic apparatus including a DC/DC converter according to an embodiment of the present disclosure.

Subsequently, the applications of the DC/DC converter 100 will be described. FIG. 12 is a view showing one example of an electronic apparatus 700 including a DC/DC converter 100 according to an embodiment of the present disclosure. The electronic apparatus 700 is, for example, a battery-driven device such as a smart phone, a cellular phone terminal, a digital camera, a digital video camera, a tablet terminal, a portable audio player or the like. The electronic apparatus 700 includes a housing 702, a battery 704, a microprocessor 706 and a DC/DC converter 100. The DC/DC converter 100 receives a battery voltage $V_{BAT}$ ($=V_{IN}$) from the battery 704 to its input line 104 and supplies an output voltage $V_{OUT}$ to the microprocessor 706 connected to an output line 106.

The present disclosure has been described above by way of embodiments. The disclosed embodiments are illustrated only. It should be understood by those skilled in the art that various modifications to combinations of elements or processes may be made and such modifications fall within the scope of the present disclosure. Such modifications will be described below.

(First Modification)

Figure 13:
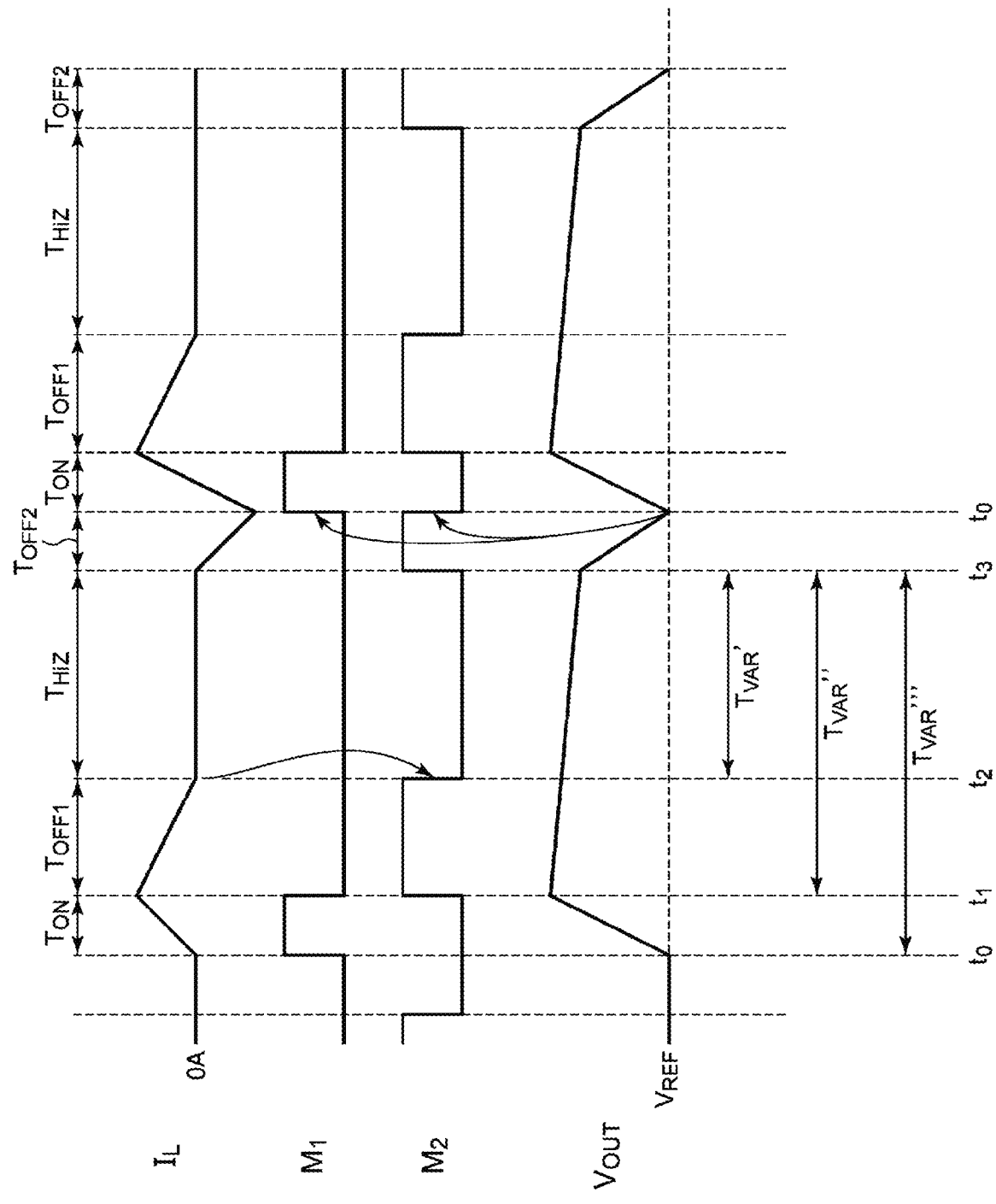
FIG. 13 is an operation waveform diagram of a DC/DC converter according to a first modification.

FIG. 13 is an operation waveform diagram of a DC/DC converter 100 according to a first modification. In this modification, the variable time $T_{VAR}$ is controlled in synchronization with the switching of the DC/DC converter 100. That is, a timer does not perform free running, and starts counting in synchronization with turning-on (or turning-off) of the switching transistor $M_1$ and the rectifying transistor $M_2$. The circuit operation can be stabilized by this synchronization.

In one modification, the timer may start measuring the variable time $T_{VAR}'$ with the turning-off of the rectifying transistor $M_2$, that is, the transition to the high impedance state $T_{HiZ}$, as a trigger. In this case, the timer 226 in FIG. 11 may start time counting with the assertion of the zero-cross detection signal $S_{ZERODET}$ as a trigger.

In one modification, the timer may start measuring the variable time $T_{VAR}''$ with the turning-on of the rectifying transistor $M_2$, that is, the transition to the off state $T_{OFF1}$, as a trigger. In this case, the timer 226 in FIG. 11 may start time counting with the assertion of the off signal $S_{OFF}$ as a trigger.

In one modification, the timer may start measuring the variable time $T_{VAR}'''$ with the turning-on of the rectifying transistor $M_1$, that is, the transition to the on state $T_{ON}$, as a trigger. In this case, the timer 226 in FIG. 11 may start time counting with the assertion of the on signal $S_{ON}$ as a trigger.

In these modifications, the variable time $T_{VAR}$ and the switching period do not completely match with each other. However, since the on time $T_{ON}$ and the off time $T_{OFF1}$ are often time scales shorter than 1 μs and therefore can be ignored in comparison with the variable time $T_{VAR}$, in these modifications as well, the switching frequency $f_{SW}$ can be approximated by $1/T_{VAR}$.

(Second Modification)

Although the step-down converter has been described in the embodiment, the present disclosure is applicable to a step-up converter or a step-down/up converter.

(Third Modification)

In the embodiment, the variable time $T_{VAR}$ is controlled so that the switching frequency $f_{SW}$ is periodically varied. However, the present disclosure is not limited thereto. The variable time $T_{VAR}$ may be changed pseudo-randomly. Alternatively, the variable time $T_{VAR}$ may be changed with some discrete values.

While the present disclosure has been described by way of specific embodiments, it is to be understood that the disclosed embodiments are merely illustrative of the principles and applications of the present disclosure. Many modifications and arrangements can be made without departing from the spirit of the present disclosure.

According to the present disclosure in some embodiments, it is possible to provide the function of noise countermeasures.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a DC/DC converter, comprising:
    a driver configured to (i) turn on a switching transistor and turn off a rectifying transistor in an on state, (ii) turn off the switching transistor and turn on the rectifying transistor in an off state, and (iii) turn off the switching transistor and turn off the rectifying transistor in a high impedance state; and
    a switching controller configured to control the on state, the off state, and the high impedance state,
    wherein the switching controller is further configured to repeat a process including:
        transitioning to the off state when a predetermined condition is satisfied in the on state;
        transitioning to the high impedance state with a zero-cross of a coil current flowing into an inductor as a trigger in the off state;
        measuring a variable time for each cycle and transitioning to the off state with time-up as a trigger; and
        transitioning to the on state when a feedback voltage corresponding to an output voltage of the DC/DC converter decreases to a lower threshold voltage, and
    wherein the switching controller includes:
        an off signal generation circuit that asserts an off signal when the predetermined condition is satisfied;
        a zero-cross detection circuit that asserts a zero-cross detection signal upon detecting the zero-cross of the coil current;
        a timer that measures time and asserts a timer signal when the variable time elapses;
        a frequency controller that changes the variable time to be measured by the timer;
        a bottom detection circuit that asserts an on signal when the feedback voltage decreases to the lower threshold voltage; and
        a logic circuit that transitions to the off state in response to the assertion of the off signal, transitions to the high impedance state in response to the assertion of the zero-cross detection signal, transitions to the off state in response to the assertion of the timer signal, and transitions to the on state in response to the assertion of the on signal.

2. The control circuit of claim 1, wherein the timer repeats the measurement of the variable time in a free run.

3. The control circuit of claim 1, wherein the timer starts time measurement with the transition to the high impedance state as a trigger.

4. The control circuit of claim 1, wherein the timer starts time measurement with a transition from the off state or the transition to the off state as a trigger.

5. The control circuit of claim 1, wherein the variable time periodically varies.

6. The control circuit of claim 5, wherein the variable time varies such that a periodic waveform of a switching frequency of the DC/DC converter becomes vertically asymmetrical.

7. The control circuit of claim 6, wherein a time average value of the periodic waveform of the switching frequency is lower than a midpoint frequency between a peak frequency and a bottom frequency of the periodic waveform.

8. The control circuit of claim 6, wherein the periodic waveform of the switching frequency varies relatively linearly in a high frequency region and varies relatively curvilinearly in a low frequency region.

9. The control circuit of claim 6, wherein the periodic waveform of the switching frequency varies with a relatively large slope in a high frequency region and varies with a relatively small slope in a low frequency region.

10. The control circuit of claim 6, wherein the periodic waveform of the switching frequency is at least partially included in an audible band.

11. The control circuit of claim 1, wherein the control circuit is integrated on a single semiconductor substrate.

12. A DC/DC converter comprising:
    a control circuit including:
        a driver configured to (i) turn on a switching transistor and turn off a rectifying transistor in an on state, (ii)

turn off the switching transistor and turn on the rectifying transistor in an off state, and (iii) turn off the switching transistor and turn off the rectifying transistor in a high impedance state; and a switching controller configured to control the on state, the off state, and the high impedance state, wherein the switching controller is further configured to repeat a process including:

transitioning to the off state when a predetermined condition is satisfied in the on state;

transitioning to the high impedance state with a zero-cross of a coil current flowing into an inductor as a trigger in the off state;

measuring a variable time for each cycle and transitioning to the off state with time-up as a trigger; and transitioning to the on state when a feedback voltage corresponding to an output voltage of the DC/DC converter decreases to a lower threshold voltage; and an output circuit including at least the inductor or a transformer, the switching transistor, the rectifying transistor and an output capacitor, wherein the switching controller includes:

an off signal generation circuit that asserts an off signal when the predetermined condition is satisfied;

a zero-cross detection circuit that asserts a zero-cross detection signal upon detecting the zero-cross of the coil current a timer that measures time and asserts a timer signal when the variable time elapses;

a frequency controller that changes the variable time to be measured by the timer;

a bottom detection circuit that asserts an on signal when the feedback voltage decreases to the lower threshold voltage; and a logic circuit that transitions to the off state in response to the assertion of the off signal, transitions to the high impedance state in response to the assertion of the zero-cross detection signal, transitions to the off state in response to the assertion of the timer signal, and transitions to the on state in response to the assertion of the on signal.

13. An electronic apparatus comprising: the DC/DC converter of claim 12.

14. A control method of a DC/DC converter, comprising:

turning on a switching transistor and turning off a rectifying transistor in an on state;

transitioning to an off state when a predetermined time elapses in the on state or when a coil current flowing into an inductor reaches a predetermined peak value;

turning off the switching transistor and turning on the rectifying transistor in the off state;

transitioning to a high impedance state with a zero-cross of the coil current flowing into the inductor as a trigger in the off state;

measuring a variable time for each cycle by a timer;

transitioning to the off state with time-up of the timer as a trigger; and transitioning to the on state when a feedback voltage corresponding to an output voltage of the DC/DC converter decreases to a lower threshold voltage, wherein the variable time periodically varies, wherein the variable time varies such that a periodic waveform of a switching frequency of the DC/DC converter becomes vertically asymmetrical, and wherein a time average value of the periodic waveform of the switching frequency is lower than a midpoint frequency between a peak frequency and a bottom frequency of the periodic waveform.

15. The control method of claim 14, wherein the periodic waveform of the switching frequency varies relatively linearly in a high frequency region and varies relatively curvilinearly in a low frequency region.

16. The control method of claim 14, wherein the periodic waveform of the switching frequency varies with a relatively large slope in a high frequency region and varies with a relatively small slope in a low frequency region.

* * * * *